United States Patent
Yang et al.

(10) Patent No.: US 8,537,785 B2
(45) Date of Patent: Sep. 17, 2013

(54) METHOD AND APPARATUS FOR CELL/SECTOR COVERAGE OF A PUBLIC CHANNEL THROUGH MULTIPLE ANTENNAS

(75) Inventors: Xuezhi Yang, Shenzhen (CN); Wei Jiang, Shenzhen (CN)

(73) Assignee: Huawei Technologies Co., Ltd, Shenzhen (CN)

(*) Notice: Subject to any disclaimer, the term of this patent is extended or adjusted under 35 U.S.C. 154(b) by 461 days.

(21) Appl. No.: 12/782,279

(22) Filed: May 18, 2010

(65) Prior Publication Data
US 2010/0226337 A1  Sep. 9, 2010

Related U.S. Application Data

(63) Continuation of application No. PCT/CN2010/070892, filed on Mar. 5, 2010.

(30) Foreign Application Priority Data

Mar. 5, 2009 (CN) .................. PCT/CN2009/070647
Jun. 5, 2009 (CN) .................. PCT/CN2009/072141

(51) Int. Cl.
*H04J 3/00* (2006.01)
*H04M 1/00* (2006.01)

(52) U.S. Cl.
USPC ........................................ 370/334; 455/562.1

(58) Field of Classification Search
CPC .. H04B 7/0617; H04B 7/0434; H04B 7/0491; H04B 7/0615; H04B 7/0854; H04B 7/086; H04L 1/0668; H04W 16/00; H04W 52/24; H04W 52/343; H04W 52/346; H04W 52/40; H04W 52/42; H04W 72/046
USPC ............. 370/329, 330, 334, 336; 455/562.1, 455/575.7
See application file for complete search history.

(56) References Cited

U.S. PATENT DOCUMENTS 6,154,661 A  11/2000  Goldburg
6,459,895 B1* 10/2002  Hastings et al. .............. 455/424

(Continued)

FOREIGN PATENT DOCUMENTS

CN  1286001 A  2/2001
CN  1127871 C  11/2003

(Continued)

OTHER PUBLICATIONS

First Chinese Office Acion of Chinese Application No. 201080000891.0 mailed Nov. 2, 2012, 10 pages. (Partial Translation).

International Search Report received in Patent Cooperation Treaty Application No. PCT/CN2009/070647, mailed Dec. 10, 2009, 3 pages.

(Continued)

*Primary Examiner* — Ayaz Sheikh
*Assistant Examiner* — Hoang-Chuong Vu
(74) *Attorney, Agent, or Firm* — Slater & Matsil, L.L.P.

(57) ABSTRACT

A method for cell/sector coverage of a public channel through multiple antennas includes: dividing the physical resource for transmitting public channel signals in a frame into N physical resource blocks; generating N weighting vectors, where: each weighting vector comprises M weighting coefficients, M is equal to the number of antennas, and the difference of average antenna gain for N weighting vectors in different directions of a whole cell/sector is less than a preset value; selecting one of the N weighting vectors for each of the N physical resource blocks respectively, where the weighting vector varies with different physical resource blocks; and using the M weighting coefficients in the selected weighting vectors to weight the public channel signals in M antennas respectively, and transmitting the weighted public channel signals through the M antennas. In addition, an apparatus for cell/sector coverage of a public channel through multiple antennas is disclosed.

17 Claims, 6 Drawing Sheets

(56) References Cited

U.S. PATENT DOCUMENTS

| | | | |
|---|---|---|---|
| 6,920,192 B1* | 7/2005 | Laroia et al. | 375/347 |
| 7,432,856 B1* | 10/2008 | Hornbostel et al. | 342/372 |
| 7,933,560 B2* | 4/2011 | Han et al. | 455/69 |
| 2003/0022695 A1* | 1/2003 | Homsi | 455/562 |
| 2003/0067970 A1* | 4/2003 | Kim | 375/148 |
| 2005/0162327 A1* | 7/2005 | Mori | 343/770 |
| 2005/0181833 A1* | 8/2005 | Lee et al. | 455/562.1 |
| 2006/0148427 A1* | 7/2006 | Hamalainen et al. | 455/101 |
| 2006/0148525 A1* | 7/2006 | Moon et al. | 455/562.1 |
| 2008/0144738 A1 | 6/2008 | Naguib | |
| 2009/0268835 A1* | 10/2009 | Imai et al. | 375/267 |
| 2010/0159861 A1* | 6/2010 | Becker et al. | 455/205 |
| 2010/0284294 A1* | 11/2010 | Salzer et al. | 370/252 |
| 2012/0076033 A1* | 3/2012 | Mundarath et al. | 370/252 |

FOREIGN PATENT DOCUMENTS

| | | |
|---|---|---|
| CN | 1622490 A | 6/2005 |
| CN | 101304278 A | 11/2008 |
| CN | 101335553 A | 12/2008 |
| WO | WO 2005053185 A1 * | 6/2005 |
| WO | WO 2008/077056 A1 | 6/2008 |

OTHER PUBLICATIONS

Written Opnion of the International Searching Authority received in Patent Cooperation Treaty Application No. PCT/CN2009/070647, mailed Dec. 10, 2009, 3 pages.

International Search Report received in Patent Cooperation Treaty Application No. PCT/CN2009/072141, mailed Dec. 17, 2009, 4 pages.

Written Opnion of the International Searching Authority received in Patent Cooperation Treaty Application No. PCT/CN2009/072141, mailed Dec. 17, 2009, 4 pages.

International Search Report received in Patent Cooperation Treaty Application No. PCT/CN2010/070892, mailed Jun. 17, 2010, 3 pages.

Written Opnion of the International Searching Authority received in Patent Cooperation Treaty Application No. PCT/CN2010/070892, mailed Jun. 17, 2010, 4 pages.

Second Chinese Office Action for Chinese Application No. 201080000891.0, mailed May 24, 2013, Partial English Translation, 10 pages.

* cited by examiner

METHOD AND APPARATUS FOR CELL/SECTOR COVERAGE OF A PUBLIC CHANNEL THROUGH MULTIPLE ANTENNAS

CROSS-REFERENCE TO RELATED APPLICATIONS

This application is a continuation of International Application No. PCT/CN2010/070892, filed on Mar. 5, 2010, which claims priority to International Patent Application No. PCT/CN2009/070647, filed on Mar. 5, 2009 and International Patent Application No. PCT/CN2009/072141, filed on Jun. 5, 2009, which claims priority to International Patent Application No PCT/CN2009/070647, filed on Mar. 5, 2009, all of which are hereby incorporated by reference in their entireties.

FIELD OF THE INVENTION

The present invention relates to communication technologies, and in particular, to a method and an apparatus for cell/sector coverage of a public channel through multiple antennas.

BACKGROUND OF THE INVENTION

Since 1990s, the wireless communication industry has experienced explosive growth. With the voice, data and video services being provided to mobile equipments, the wireless communication system needs to provide higher and higher capacity. However, available spectrum resources are increasingly scarce. Therefore, improving the spectrum efficiency becomes an essential research topic of wireless communications.

Technologies for improving the spectrum efficiency include: multiple access, signal detection, modulation and channel coding. Among such technologies, the Multi-Antenna System (MAS) is highly promising and becomes more and more important in the wireless communications.

As one of the MAS, Smart Antennas (SA) is also known as an Antenna Array System (AAS). The spacing between array elements of an SA is generally less than the correlation distance of channels. Utilizing the channel correlation of transmitted signals on SA, beam forming is implemented, and high-gain narrow beams are directed to the desired mobile terminal adaptively, and null are adjusted and directed to the interference direction.

A Multiple Input Multiple Output (MIMO) system is another style of the MAS. Foschini has proved theoretically enormous potentiality of the MIMO system for improving the spectrum efficiency. With a MIMO system, the channel capacity increases linearly with the number of antennas (in proportion to the minimum number of antennas on the transmitter side and the receiver side). A MAS can combine with Space Time Coding (STC) to generate spatial diversity, reduce the Bit Error Rate (BER) and improve the system reliability. A MAS may utilize a Bell Labs Layered Space Time (BLAST) structure, which forms parallel sub-channels, improves the capacity of the channel and supports higher data rate by means of space multiplexing. A MIMO system is similar to a SA except for different antenna spacing.

In a cellular communication system, a base station allocates a dedicated channel to each active user within a cell or sector, and the dedicated channel is designed to bear voice, data or video traffics. Based on a multi-antenna base station, beam forming or pre-coding may be applied on the dedicated channel to transmit user-specific signals, and reduce intra-cell or inter-cell interference.

In an actual mobile communication system, a cell/sector has not only dedicated channels, but also public channels. A public channel bears public information required by all mobile terminals in the cell/sector, for example, system information in the broadcast channel; reference signals in the synchronization channel; and pilot, paging and public control messages in a Forward Access Channel (FACH). The cell coverage required for a public channel is sharply different from the coverage required for a dedicated channel. In a public channel, all mobile terminals in the cell/sector need to receive signals simultaneously, and the base station needs to cover the whole cell/sector properly.

In the prior art, a solution to covering the whole cell/sector through an antenna array divides the transmitting time of the public channel into timeslots, selects a group of weighting vectors whose beam patterns complement each other, and uses the complementary weighting vectors alternately in continuous timeslots, thus covering the whole cell/sector based on SA.

In the prior art described above, although multiple complementary weighting vectors are used alternately, the total number of weighting vectors is limited, and the beam pattern corresponding to each weighting vector is fixed. Therefore, the average of the antenna gain of multiple beam patterns is not completely equal in different directions, but is approximately isotropic only. Consequently, the BER performance varies in different directions.

Besides, the prior art described above is intended for only the smart antenna system of linear arrays, and not for other MAS such as MIMO system, and not for other antenna arrays such as square arrays and circular arrays.

SUMMARY OF THE INVENTION

The embodiments of the present invention provide a method and an apparatus for cell/sector coverage of a public channel through multiple antennas to accomplish consistent quality of signals received in all directions.

A method for cell/sector coverage of a public channel through multiple antennas in an embodiment of the present invention includes: dividing a time-frequency resource for transmitting public channel signals in a frame into N time-frequency resource blocks, where N is a positive integer greater than 1; generating N weighting vectors, where each weighting vector comprises M weighting coefficients, M is equal to the number of antennas, and the difference of average antenna gain for N weighting vectors in different directions of a whole cell/sector is less than a preset value; selecting one of the N weighting vectors for each of the N time-frequency resource blocks respectively, where the weighting vector varies with different time-frequency resource blocks; and using M weighting coefficients in the selected weighting vectors to weight the public channel signals in M antennas respectively, and transmitting the weighted public channel signals through the M antennas.

A method for cell/sector coverage of a public channel through multiple antennas in an embodiment of the present invention includes: dividing a physical resource for transmitting public channel signals in a frame into N physical resource blocks, where N is a positive integer greater than 1; generating N weighting vectors, where: each weighting vector comprises M weighting coefficients, M is equal to the number of antennas, and the difference of average antenna gain for N weighting vectors in different directions of a whole cell/ sector is less than a preset value; selecting one of the N weighting vectors for each of the N physical resource blocks respectively, where the weighting vector varies with different physical resource blocks; and using M weighting coefficients in the selected weighting vectors to weight the public channel signals in M antennas respectively, and transmitting the weighted public channel signals through the M antennas.

An apparatus for cell/sector coverage of a public channel through multiple antennas in an embodiment of the present invention includes: a dividing unit, configured to divide a time-frequency resources for transmitting public channel signals in a frame into N time-frequency resources blocks, where N is a positive integer greater than 1; a generating unit, configured to generate N weighting vectors, where each weighting vector comprises M weighting coefficients, M is equal to the number of antennas, and the difference of average antenna gain for N weighting vectors in different directions of a whole cell/sector is less than a preset value; a weighting vector selecting unit, configured to select one of the N weighting vectors for each of the N time-frequency resource blocks respectively, where the weighting vector varies with different time-frequency resource blocks; a weighting unit, configured to use M weighting coefficients in the selected weighting vectors to weight the public channel signals in M antennas respectively; and a transmitting unit, configured to transmit the weighted public channel signals through the M antennas.

An apparatus for cell/sector coverage of a public channel through multiple antennas in an embodiment of the present invention includes: a dividing unit, configured to divide a physical resources for transmitting public channel signals in a frame into N physical resources blocks, where N is a positive integer greater than 1; a generating unit, configured to generate N weighting vectors, where: each weighting vector comprises M weighting coefficients, M is equal to the number of antennas, and the difference of average antenna gain for N weighting vectors in different directions of a whole cell/sector is less than a preset value; a weighting vector selecting unit, configured to select one of the N weighting vectors for each of the N physical resource blocks respectively, where the weighting vector varies with different physical resource blocks; a weighting unit, configured to use M weighting coefficients in the selected weighting vectors to weight the public channel signals in M antennas respectively; and a transmitting unit, configured to transmit the weighted public channel signals through the M antennas.

The embodiments of the present invention bring the following benefits:

In an embodiment of the present invention, each different time-frequency resource block selects different phases to transform the base weighting vector and dynamically rotates the beam pattern. Therefore, in the specified direction, the antenna gain changes randomly, the average strength of transmitted power is equal in all directions, and the quality of signals received in all directions in the whole cell/sector is consistent.

Secondly, simulation experiment proves that the embodiments of the present invention are not only applicable to smart antenna systems, but also applicable to MIMO systems; not only applicable to linear antenna arrays, but also applicable to circular arrays, square arrays, and other forms of antenna arrays.

DETAILED DESCRIPTION OF THE EMBODIMENTS

The embodiments of the present invention provide a method and an apparatus for cell/sector coverage of a public channel through multiple antennas to accomplish consistent quality of signals received in all directions in a whole cell/sector.

A method for cell/sector coverage of a public channel through multiple antennas in an embodiment of the present invention includes:

dividing a physical resource for transmitting public channel signals in a frame into N physical resource blocks, where N is a positive integer greater than 1;

generating N weighting vectors, where each weighting vector comprises M weighting coefficients, M is equal to the number of antennas, and the difference of average antenna gain for N weighting vectors in different directions of a whole cell/sector is less than a preset value;

selecting one of the N weighting vectors for each of the N physical resource blocks respectively, where the weighting vector varies with different physical resource blocks; and using M weighting coefficients in the selected weighting vectors to weight the public channel signals in M antennas respectively, and transmitting the weighted public channel signals through the M antennas.

The physical resources may be time resource or frequency resource (such as sub-carriers resource in an Orthogonal Frequency Division Multiple system) or codes resource (such as spreading codes resource in a Code Division Multiple Access system) or any other resource for communication or any combination of the above resources. Although the embodiments take the time-frequency resource as example, the same procedure may be performed using other resources.

A method for cell/sector coverage of a public channel through multiple antennas in an embodiment of the present invention includes the following steps:

(1) Divide a time-frequency resource for transmitting public channel signals in a frame into N time-frequency resource blocks, where N is a positive integer greater than 1.

In this embodiment, when public channel signals need to be transmitted through multiple antennas, the transmitting time of the public channel signals is divided into continuous frames (namely, the time axis is divided into time segments, and each time segment is a frame), and then the time-frequency resource for transmitting public information in each frame is divided into N time-frequency resource blocks, where N is a positive integer greater than 1.

(2) Generate N weighting vectors, where: each weighting vector comprises M weighting coefficients, M is equal to the number of antennas, and the difference of average antenna gain for N weighting vectors in different directions is less than a preset value.

After the time-frequency resource is divided, N weighting vectors are generated. The detailed process of generating weighting vectors will be described in subsequent embodiments, and is not specified here.

It is worthy of attention that in this embodiment, the generated N weighting vectors need to comply with a specific rule, namely, the difference of average beam pattern for N weighting vectors in different directions of a whole cell/sector is less than a preset value.

(3) Select one of the N weighting vectors for each of the N time-frequency resource blocks respectively, where the weighting vector is unique for each time-frequency resource block.

After N weighting vectors are generated, namely, different weighting vectors may be selected for different time-frequency resource blocks sequentially or randomly. The detailed selection process will be described in subsequent embodiments.

(4) Use M weighting coefficients in the selected weighting vectors to weight the public channel signals in M antennas respectively, and transmit the weighted public channel signals through the M antennas.

After the corresponding weighting vectors are selected, M weighting coefficients in the selected weighting vectors may be used to weight the public channel signals in M antennas respectively, and the weighted public channel signals may be transmitted through the M antennas.

In this embodiment, because the difference of average beam pattern for N weighting vectors in different directions of a whole cell/sector is less than a preset value, the average antenna power gain is isotropic, and the quality of signals received in all directions of the whole cell/sector is consistent.

Figure 1:
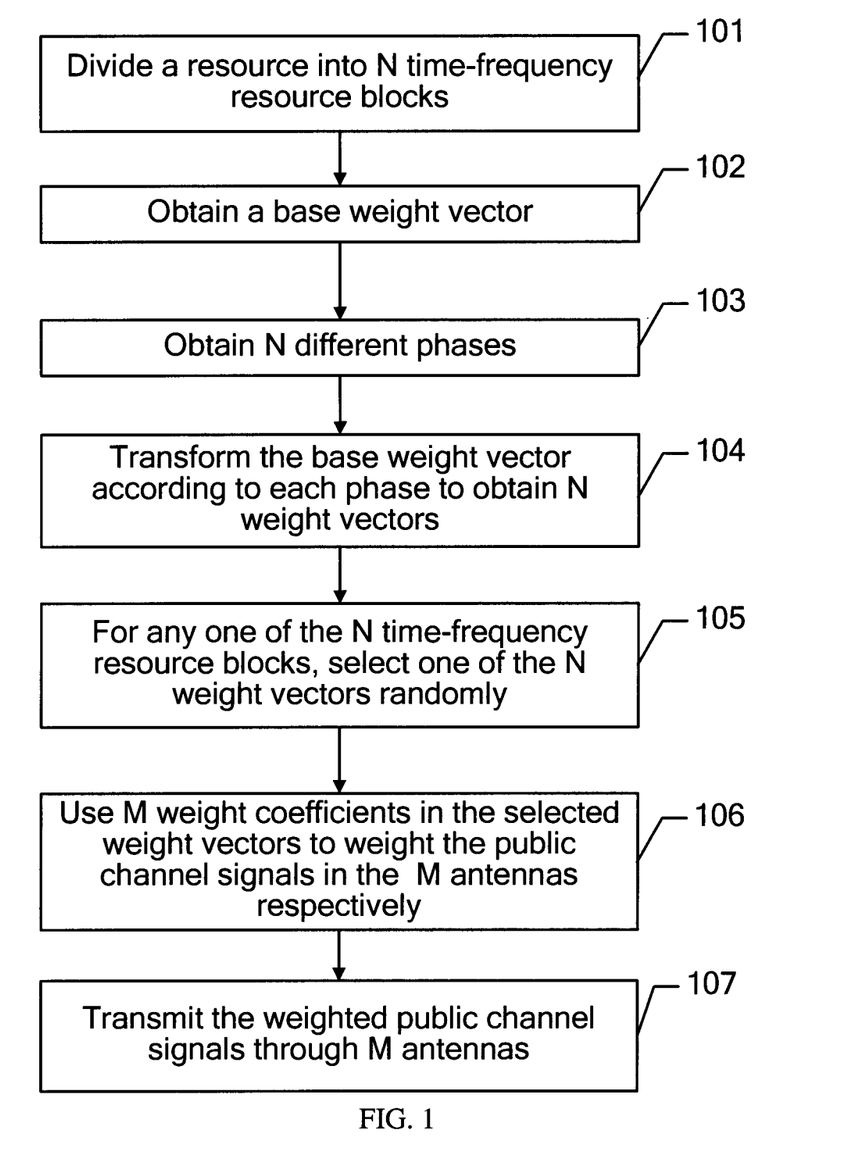
FIG. 1 is a flowchart of a method for cell/sector coverage of a public channel through multiple antennas in an embodiment of the present invention.

To make the technical solution more understandable, the method for cell/sector coverage of a public channel through multiple antennas in an embodiment of the present invention is elaborated below with reference to accompanying drawings. As shown in FIG. 1, the method includes the following steps:

101: Divide time-frequency resources.

In this embodiment, when public channel signals need to be transmitted through multiple antennas, the transmitting time of the public channel signals is divided into continuous frames (namely, the time axis is divided into time segments, and each time segment is a frame), and then the time-frequency resource for transmitting public information in each frame is divided into N time-frequency resource blocks, where N is a positive integer greater than 1.

102: Obtain a base weighting vector.

In this embodiment, a base weighting vector $w=[w_1 \, w_2 \ldots w_M]^T$ is designed first. The base weighting vector comprises M weighting coefficients. The weighting coefficients are $w_m$, $m=1, \ldots, M$. M weighting coefficients correspond to M transmitting chains, and M transmitting chains correspond to M antennas, where M is a positive integer greater than 1.

Here, $x^T$ refers to transposition of x, for example, $[w_1 \, w_2 \ldots w_M]^T$ refers to transposition of matrix $[w_1 \, w_2 \ldots w_M]$.

The coverage angle of the beam patterns generated by beam forming of the base weighting vector fulfills the preset threshold, the flatness of the beam patterns fulfills the preset threshold, and the peak-to-average ratio is less than the preset threshold. That is, the beam patterns is characterized by wide coverage angle, flat beam patterns, and low peak-to-average ratio.

In order to reduce costs and avoid utilization of high-power amplifiers, a requirement may be set that all antennas have the same transmitting power, namely, the modulus of every weighting coefficient in the corresponding base weighting vector is identical, $|w_1|=|w_2|=\ldots=|w_M|$.

103. Obtain N different phases.

In this embodiment, N different phases are obtained, which correspond to N time-frequency resource blocks in the current frame, respectively. Specifically, N phases may be selected among $[0, 2\pi]$ according to a certain criterion. After transformed the base weighting vector by the selected phases, the beam patterns of the generated weighting vectors complement each other in angle domain, and the average antenna gain in different directions in the whole cell/sectors is preferably the same. The phases that meet the requirement may be found through computer search or repeated tests. For example, the required phases are selected among $[0, 2\pi]$ through MATLAB software.

104: Transform the base weighting vector according to each phase to obtain N weighting vectors.

After the base weighting vector and N phases are obtained, the base weighting vector may be transformed according to every phase to obtain N weighting vectors, which correspond to N time-frequency resource blocks, as detailed below:

It is assumed that a random time-frequency resource block is represented by t. The phase $\phi(t)$ is selected, and the base weighting vector is transformed according to the following formula to generate a new weighting vector $w(t)$:

$$w(t)=\text{diag}[1\, e^{j\phi(t)}\, e^{j2\phi(t)} \ldots e^{j(M-1)\phi(t)}]\cdot w \quad (1)$$

In the formula above, w represents a base weighting vector, $j=\sqrt{-1}$ and $\text{diag}[x_1 \ldots x_n]$ represents a diagonal array composed of the elements from $x_1$ to $x_n$ in the square brackets.

It is worthy of attention that the weighting vector may be calculated not only through formula (1) above, but also by other means, for example:

Select a phase among N different phases;

Add a phase on the phase angle of the $m^{th}$ weighting coefficient of the base weighting vector, where m is an ordinal number ranging from 1 to M, and the added phase is in proportion to m-fold of the selected phase;

Use the vector with the added phase as a weighting vector; and

Repeat the foregoing process of selecting the phase and adding the phase on the phase angle until N weighting vectors are obtained.

It is understandable that in practice, more modes may be applied to the use of the phase to transform the base weighting vector and obtain the weighting vectors, and the specific mode applied is not specified here.

In this embodiment, steps 101-104 are a process of obtaining N weighting vectors according to the phase and the base weighting vector. It is worthy of attention that in practice, the weighting vector may be obtained in other methods only if such methods make average power gain difference in different directions of the N weighting vectors less than a preset value. The specific method is not specified herein.

105: For any one of the N time-frequency resource blocks, select one of the N weighting vectors randomly.

In step 104, N weighting vectors can be calculated out according to the N phases and the base weighting vector. The N weighting vectors are different from one another, and correspond to the N time-frequency resource blocks. For a time-frequency resource block, one of the N weighting vectors may be selected in any of the following methods:

I. Sequential Selection

Select one of the N weighting vectors according to the order of the time-frequency resource blocks. For example, for the first time-frequency resource block, select the first weighting vector; for the second time-frequency resource block, select the second weighting vector, and so on.

II. Random Selection

For a time-frequency resource block, select one of the N weighting vectors randomly according to a specific rule. The rule may be: every weighting vector is selected only once, and every weighting vector is selected.

106: Use M weighting coefficients in the selected weighting vectors to weight the public channel signals in the M antennas respectively.

After a time-frequency resource block determines the selected weight vector, the public channel signals are weighted, and undergo beam forming according to the weight vector. Therefore, the beam pattern of the time-frequency resource block is:

$$g(\theta, t) = w(t)^H \alpha(\theta)$$

In the formula above, $\alpha(\theta)$ represents a steering vector of the antenna array, and the steering vector is M-dimensional column vector; $\theta$ represents a direction angle formed by the signal and the antenna array; and $w(t)^H$ represents conjugate transposition of the vector $w(t)$.

For example, if the multi-antenna system is a linear antenna array, the formula above may be:

$$g(\theta, t) = w(t)^H \alpha(\theta) = \sum_{m=1}^{M} w_m^*(t) e^{-j\frac{2\pi}{\lambda}(m-1)d\sin\theta - j(m-1)\phi(t)} \quad (2)$$

In formula (2) $w(t)^H$ represents conjugate transposition of the vector $w(t)$; $\alpha(\theta)$ represents the steering vector of the antenna array, and this vector is an M-dimensional column vector; $\theta$ represents the direction angle formed by the signal and the antenna array; M represents the number of antennas, $w_m(t)$ represents the weighting coefficient of the time-frequency resource block numbered t on the antenna numbered m; $w_m^*(t)$ represents the conjugate of $w_m(t)$, and d represents the spacing between array elements; $j=\sqrt{-1}$.

After the base weighting vector is transformed according to formula (1), its beam pattern can still be characterized by wide coverage angle, flat beams, and low peak-to-average ratio, except that the beam pattern has rotated by an angle of $\theta(t)$. It is worthy of attention that the rotation described here does not refer to rotating the beam pattern directly, but refers to changing the shape of the beam pattern by rotating the phase of the weight vector.

Figure 2:
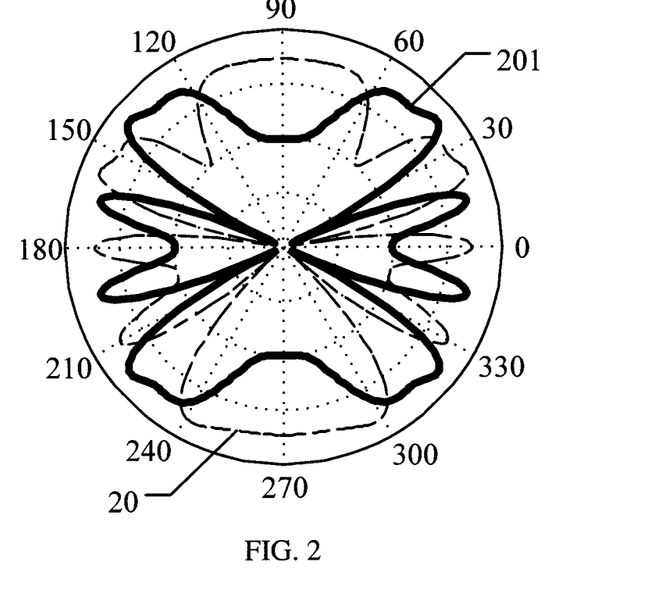
FIG. 2 is a beam pattern in an embodiment of the present invention.

It is assumed that the beam pattern of the base weighting vector is illustrated by the solid line 201 in FIG. 2, the beam generated by this weighting vector is characterized by wide coverage angle, flat beam, and low peak-to-average ratio. The beam pattern generated by the base weighting vector has a very small gain or zero gain near the angle 30°, 150°, 210°, and 330°, but has a high power gain near the angle 15°, 165°, 225°, and 315°.

For example, $\theta(t)=45°$ is selected, and the base weighting vector is transformed according to formula (1). The beam pattern of the new weighting vector w(t) is illustrated by the dotted line 202 in FIG. 2. The beam pattern generated by the new weighting vector is still characterized by wide coverage angle, flat beam, and low peak-to-average ratio. The beam pattern generated by the new weighting vector has a high gain near the angle 30°, 150°, 210°, and 330°, but has zero or a very small gain near the angle 15°, 165°, 225°, and 315°. Therefore, the two beam patterns complement each other exactly. For a specific direction, high gain and low gain of the antenna array occur alternately. Through channel coding and interleaving, the public channel can be covered in the whole cell/sector.

107: Transmit the weighed public channel signals through M antennas.

After completion of weight the public channel signals, the weighted public channel signals are transmitted through the M antennas, and the public channel signals of N time-frequency resource blocks in the current frame are transmitted in certain order.

In this embodiment, the existing antenna array elements and the low-power amplifier set in the MAS are made full use of; a base weighting vector is selected to generate beams characterized by wide coverage angle, flat beam, and low peak-to-average ratio, the base weighting vector is transformed with a random phase, and the beam pattern keeps changing. In the specified direction, the gain of the antenna changes randomly, and the average power gain of the antenna array is isotropic.

It is worthy of attention that, after the foregoing steps are completed, the public channel signals of one frame are transmitted, and the signals cover the whole cell/sector; if the public channel signals are more than one frame, the process needs to go on to transmit the public channel signals of the next frame. With more weighting vectors, the average antenna gain is more isotropic. Therefore, in order to make the average of the antenna gain more isotropic, it is better to use different weighting vectors in different frames rather than use the weighting vector of the previous frame repeatedly.

In this embodiment, an "inter-frame incremental phase" symbolized by $\delta$ may be selected first. The phase value $\delta$ is used to update the N weighting vectors of the current frame to obtain N different second weighting vectors. Therefore, the N second weighting vectors can be used in the next frame. Specifically, the phase value $\delta$ is added to the N phase values of the current frame respectively to obtain N second phase values. By using the N second phase values, the base weighting vector is transformed according to formula (1) to generate N second weighting vectors.

Elaborated above is a process of transmitting N time-frequency resource blocks in a frame. In practice, the public channel signals are usually more than one frame. The following describes the method for cell/sector coverage of a public channel through multiple antennas in the case that multiple frames exist in an embodiment of the present invention.

The transmitting time of the public channel signals in a cell/sector of the MAS are divided into continuous time frames, and the time-frequency resource for transmitting public information in each frame is divided into N time-frequency resource blocks. Each resource block includes L modulation symbols. The time-frequency resource block numbered n in the frame numbered k is represented by $t_{k,n}$. In order to facilitate channel estimation and demodulation, it is assumed that the channel fading experienced by every L symbol is correlated with the channel fading experienced by another L symbol in every time-frequency resource block.

First, a base weighting vector $w=[w_1 \, w_2 \ldots w_M]^T$ is determined. The base weighting vector comprises M weighting coefficients. The weighting coefficients are $w_m$, m=1, ..., M. M weighting coefficients correspond to M transmitting chains, and the M transmitting chains correspond to M antennas, where M is a positive integer greater than 1.

Here, $x^T$ refers to transposition of x, for example, w= $[w_1 \ w_2 \ ... \ w_M]^T$ refers to transposition of matrix w= $[w_1 \ w_2 \ ... \ w_M]$.

The beam generated by beam forming of the base weighting vector is characterized by wide coverage angle, flat beam, and low peak-to-average ratio.

N phase values $\theta(t_{k,n})$, n=1, ..., N are selected among [0, 2π] according to a specific rule. A phase is selected among the $\theta(t_{k,n})$ sequentially or randomly (random selection needs to ensure that each phase value must be selected once but at most once). The base weighting vector is transformed according to formula (1). After N transformations, N weighting vectors are generated, namely, $w(t_{k,n})$, n=1, ..., N:

$$w(t_{k,n}) = \text{diag}[1 e^{j\phi(t_{k,n})} e^{j2\phi(t_{k,n})} \ldots e^{j(M-1)\phi(t^{k,n})}] \cdot w,$$
$$n=1, \ldots, N$$

In the formula above, w represents a base weighting vector, $j=\sqrt{-1}$, and $\text{diag}[x_1 \ldots x_n]$ represents a diagonal array composed of the elements from $x_1$ to $x_n$ in the square brackets.

After the selected N phase values are transformed, the beam patterns of the generated weighting vectors complement each other, and it is preferable to equalize the average antenna gain in different directions in the whole cell/sector. The required phase $\theta(t_{k,n})$ may be found through computer searching or repeated testing. For each time-frequency resource block in frame k, one weighting vector is selected among $w(t_{k,n})$, n=1, ..., N sequentially for beam forming. That is, for the time-frequency resource block $t_{k,n}$, the weighting vector $w(t_{k,n})$ is selected. Alternatively, for each time-frequency resource block, a weighting vector may be selected among $w(t_{k,n})$ randomly, but each weighting vector must be used and must be used only once. In a specified direction in the whole cell/sector, if the antenna gain in a time-frequency resource block is very low, the antenna gain may be high in other time-frequency resource blocks in the same frame. With respect to BER performance, the low gain of the beam pattern is equivalent to deep fading of the channel, and the impact may be eliminated through channel coding and interleaving.

If the number of weighting vectors is larger, the average of the antenna gain is more isotropic. Therefore, in order to make the average of the antenna gain more isotropic, it is better to use different N weighting vectors in different frames rather than reuse the weighting vector of the previous frame simply. In this embodiment, the processing mode is: select an "inter-frame incremental phase value" symbolized by δ, and generate the phase $\phi(t_{k+1,n})$ n=1, ... N of the frame numbered k+1 according to the following formula:

$$\phi(t_{k+1,n}) = \phi(t_{k,n}) + \delta, n=1, \ldots, N$$

Like the foregoing method of processing the frame indexed k, for each time-frequency resource block of the frame indexed k+1, a phase value is selected and the base weighting vector is transformed, and beam forming is performed by using the new weighting vector generated after the transformation.

In this embodiment, the existing antenna array elements and the low-power amplifier set in the MAS are made full use of; a base weighting vector is selected to generate beams characterized by wide coverage angle, flat beam, and low peak-to-average ratio, the base weighting vector is transformed with a random phase, and the beam pattern keeps changing. Therefore, in the specified direction, the antenna gain changes randomly, and the average antenna gain is isotropic.

Secondly, in this embodiment, the modulus of every weighting coefficient in the base weighting vector may be equal, which avoids utilization of high-power amplifiers and reduces the system cost.

Thirdly, in this embodiment, the weighting vector corresponding to each time-frequency resource block may be selected sequentially or randomly, thus improving the flexibility of the technical solution in this embodiment.

Further, in this embodiment, for different frames, the phase may be updated by using an inter-frame incremental phase value. Therefore, the phase used by every frame is different from the phase used by another frame, and the N weighting vectors used by different frames are different from one another. In this way, the average of the antenna gain is more isotropic.

Figure 3:
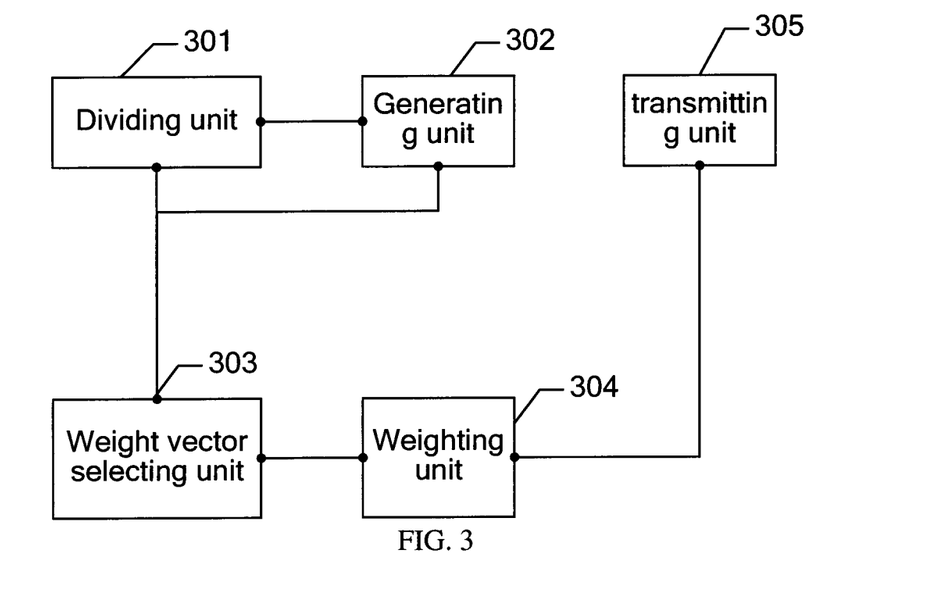
FIG. 3 is a schematic diagram of an apparatus for cell/sector coverage of a public channel through multiple antennas in an embodiment of the present invention.

The following describes the apparatus for cell/sector coverage of a public channel through multiple antennas in an embodiment of the present invention. In practice, the apparatus may be located in a base station. As shown in FIG. 3, the apparatus for cell/sector coverage of a public channel through multiple antennas in this embodiment includes:

a dividing unit 301, configured to divide a time-frequency resource for transmitting public channel signals in a frame into N time-frequency resource blocks, where N is a positive integer greater than 1;

a generating unit 302, configured to generate N weighting vectors, where: each weighting vector comprises M weighting coefficients, M is equal to the number of antennas, and the difference of average beam pattern for N weighting vectors in different directions of a whole cell/sector is less than a preset value;

a weighting vector selecting unit 303, configured to select one of the N weighting vectors for each of the N time-frequency resource blocks respectively, where the weighting vector is unequal in each time-frequency resource blocks;

a weighting unit 304, configured to use M weighting coefficients in the selected weighting vectors to weight the public channel signals in M antennas respectively; and a transmitting unit 305, configured to transmit the weighted public channel signals through the M antennas.

Figure 4:
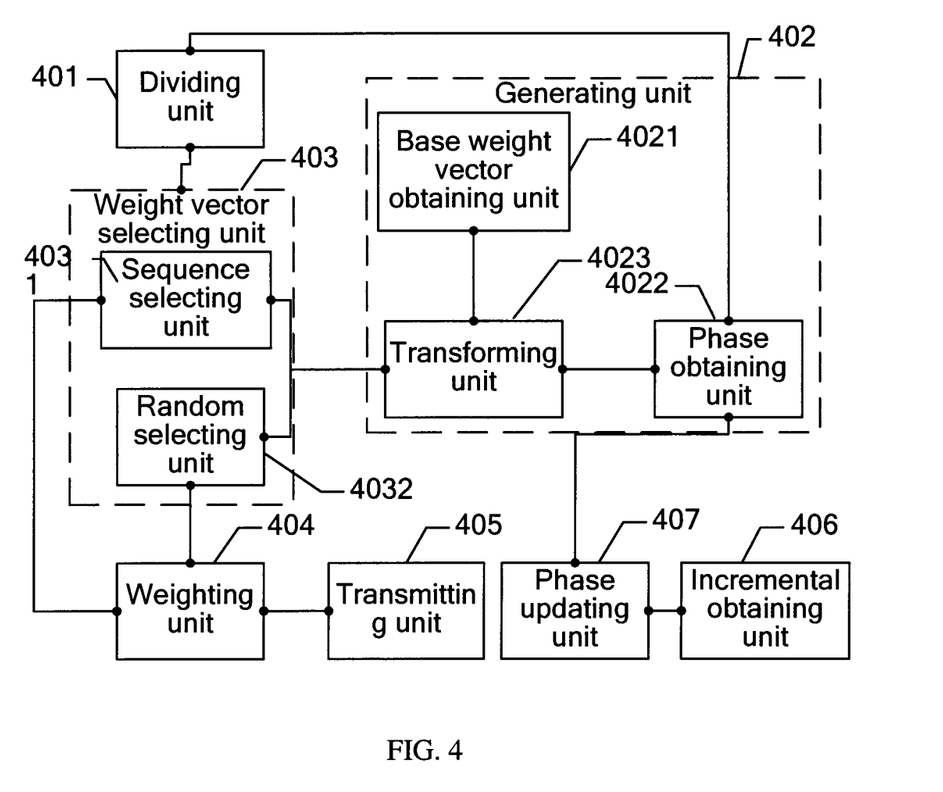
FIG. 4 is another schematic diagram of an apparatus for cell/sector coverage of a public channel through multiple antennas in an embodiment of the present invention.

To make the technical solution clearer, the following elaborates the apparatus for cell/sector coverage of a public channel through multiple antennas. As shown in FIG. 4, the apparatus for cell/sector coverage of a public channel through multiple antennas in another embodiment includes:

a dividing unit 401, configured to divide a time-frequency resource for transmitting public channel signals in a frame into N time-frequency resource blocks, where N is a positive integer greater than 1;

a generating unit 402, configured to generate N weighting vectors, where: each weighting vector comprises M weighting coefficients, M is equal to the number of antennas, and the difference of average beam pattern for N weighting vectors in different directions of a whole cell/sector is less than a preset value;

a weighting vector selecting unit 403, configured to select one of the N weighting vectors for each of the N time-frequency resource blocks respectively, where the weighting vector varies with different time-frequency resource blocks;

a weighting unit 404, configured to use M weighting coefficients in the selected weighting vectors to weight the public channel signals in M antennas respectively; and a transmitting unit 405, configured to transmit the weighted public channel signals through the M antennas.

The generating unit 402 includes:

a base weighting vector obtaining unit 4021, configured to obtain the base weighting vector, where the base weighting vector comprises M weighting coefficients and M is equal to the number of antennas;

a phase obtaining unit 4022, configured to obtain N different phases; and a transforming unit 4023, configured to transform the base weighting vector obtained by the base weighting vector obtaining unit 4021 to obtain N weighting vectors according to each phase obtained by the phase obtaining unit 4022, where the N weighting vectors are different from one another, and each of the N weighting vectors includes M weighting coefficients.

If the transmitted public channel signals are more than one frame, the apparatus in this embodiment may further include:

an incremental obtaining unit 406, configured to obtain a preset inter-frame incremental phase value;

a phase updating unit 407, configured to update the N phases obtained by the phase obtaining unit 4022 according to the inter-frame incremental phase value obtained by the incremental obtaining unit 406.

The weighting vector selecting unit 403 in this embodiment may further include:

a sequence selecting unit 4031, configured to select the corresponding weighting vector among the N weighting vectors sequentially according to the order of the N time-frequency resource blocks; or a random selecting unit 4032, configured to select one of the N weighting vectors randomly for each of the N time-frequency resource blocks respectively, where the weighting vector is unequal for each time-frequency resource block.

In this embodiment, the base weighting vector obtaining unit 4021 selects a base weighting vector to generate beams characterized by wide coverage angle, flat beams, and low peak-to-average ratio; the phase obtaining unit 4022 obtains the phase, and the transforming unit 4023 transforms the base weighting vector with random phases to keep changing the beam pattern. In the specified direction, the gain of the antenna changes randomly, and the average of the gain is isotropic. This embodiment makes the gain of multiple antennas isotropic in the whole cell/sector.

Figure 5:
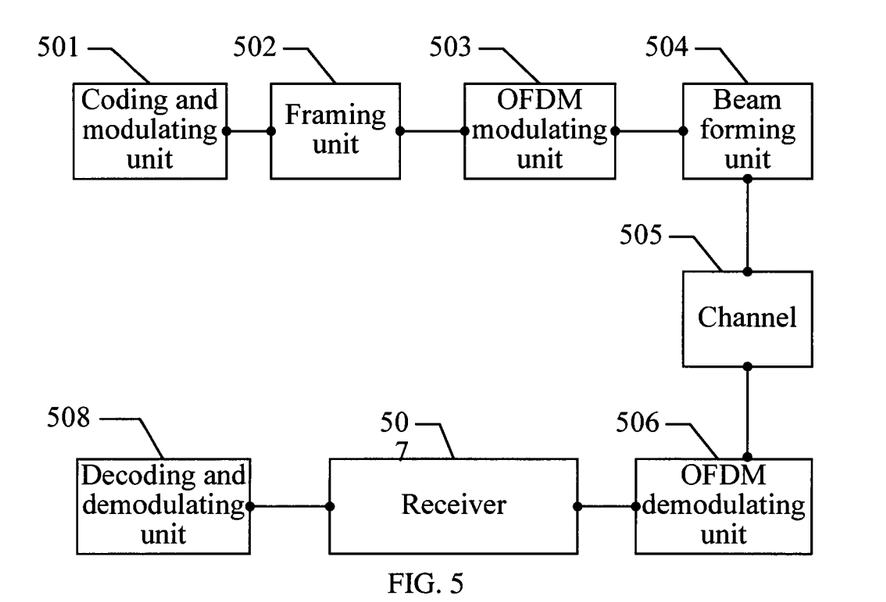
FIG. 5 shows a transceiver system in an embodiment of the present invention.

The following describes a data transmitting and receiving process performed through a transceiver system in this embodiment:

It is assumed that a linear antenna array has eight array elements. The following base weighting vector is selected:

$$w=[1\ 1\ 1\ -1\ 1\ -1\ -1\ 1]^T$$

It is assumed that the spacing between array elements of the antenna is a half wavelength d=λ/2. According to formula (2), the beam pattern of the base weighting vector may be obtained, as shown in FIG. 2. The beam pattern of the base vector covers a majority of the angle, the beams are flat, and the peak-to-average ratio is low.

FIG. 5 shows a transceiver system in this embodiment. On the transmitter side, the public channel signals pass through a coding and modulating unit 501 to generate symbol blocks. Each symbol block includes N modulation symbols, represented by vector d.

$$d=[d_1 d_2 \ldots d_N]^T$$

It is assumed that the received signal is x:

$$x=[x_1 x_2 \ldots x_N]^T$$

After the symbol blocks are obtained, a framing unit 502 combines the symbol blocks into frames, and the beam forming unit 504 forms beams out of the frames. Besides, an OFDM modulating unit 503 may perform Orthogonal Frequency Division Multiplexing (OFDM) modulation for the beams, and then the beams are transmitted to the receiver side through the channel 505. On the receiver side, an OFDM demodulating unit 506 demodulates the beams, and the demodulated beams enter the receiver 507.

It is worthy of attention that after the combining effect of beam forming, multi-path channel fading, and Additive White Gaussian Noise (AWGN), the received signal may be represented by:

$$x = \frac{1}{\sqrt{N}} H \cdot G \cdot d + n = \frac{1}{\sqrt{N}} A \cdot d + n$$

In the formula above, H is a channel response matrix. If the channel is a single-tap channel, for example, the signal is a narrowband signal in a Time Division Multiple Access (TDMA) system or in an Orthogonal Frequency Division Multiple Access (OFDMA) system, the channel response matrix is a diagonal matrix:

$$H=\text{diag}[h_1 h_2 \ldots h_N]^T$$

In the formula above, $h_1, h_2 \ldots h_N$ are channel response coefficients of N time-frequency resource blocks in each frame. A beam forming gain matrix is represented by G, and is determined by a beam pattern in the specified direction.

$$G=\text{diag}[g_1 g_2 \ldots g_N]^T$$

In the formula above, $g_1, g_2 \ldots g_N$ are antenna gains of the beam forming of N weighting vectors used in N time-frequency resource blocks, and may be calculated out according to the following formula:

$$g_n = \sum_{m=1}^{M} w_m^* e^{-j\frac{2\pi}{\lambda}(m-1)d\sin\theta - j(m-1)\phi(t_{k,n})}, n = 1, \ldots, N$$

$w_m$ is a weighting coefficient on the antenna numbered m, $w_m^*$ is a conjugate of $w_m$, d is the spacing between array elements, $j=\sqrt{-1}$, θ is a direction angle formed by the signal and the antenna array, λ is wavelength, and $\phi(t_{k,n})$ is the phase of the frame indexed k.

For simplicity, let matrix A represents a product of matrix G and matrix H, and A is a diagonal array too.

$$A=H \cdot G$$

Finally, in the decoding and demodulating unit 508, the transmitted data symbols may be demodulated through the typical Minimum Mean Square Error (MMSE) algorithm. The demodulation algorithm is:

$$d_{MMSE}=(A^H A+\sigma^2 I)^{-1}A^H x$$

Described above is a process of transmitting public channel signals. In that process, the operations performed in the beam forming unit 504 are the same as the steps of the method for cell/sector coverage of a public channel through multiple antennas in the foregoing method embodiment, and are repeated here any further.

In order to verify the solution, the following describes an simulation process in an embodiment of the present invention.

The method for cell/sector coverage through multiple antennas in an embodiment of the present invention is simulated in a MATLAB/Simulink platform. In order to verify the practicality of the embodiment of the present invention, all the selected simulation parameters are already applied in the actual communication system or the parameters defined in the standards, as shown in the following table.

TABLE 1

Simulation parameters

| Parameter | Value |
|---|---|
| Information Source | Bernoulli binary source, in which 0s and 1s are distributed at equal probability, the output bit ratio is 1 Mbps, and the simulated frame length is 288 bits |
| Channel coding | Low Density Parity Check (LDPC) codes defined in the WiMAX (IEEE802.16e) standard, in which the code length is n = 576, the code rate is 1/2, hard decision applies, the maximum iteration count is 50 times; also Convolutional Codes (CC) defined in the WiMAX(IEEE 802.16e) standard, in which the code rate is 1/2, the constraint length is equal to 7, the octal code polynomial is [133 171], and Viterbi decoding applies |
| Interleaving | Matrix interleaving 288 × 120 |
| Modulation | 4-QAM (QPSK), Gray mapping; with LDPC codes, the demodulator (soft) outputs a Log-Likelihood Ratio (LLR); with CC codes, the demodulator uses hard decision |
| OFDM | DFT length is 128, and cyclic prefix length is 16 |
| Channel estimation | Ideal channel estimation |
| Channel | Rayleigh Gaussian white noise channel, namely, VA channel defined in the 3GPP (for details, see Table 2), in which the maximum Doppler frequency offset is set to 100 Hertz, and the Signal-to-Noise Ratio (SNR) simulation range is [−2 dB, 18 dB] |
| Multiple antennas | Uniform space Linear Array (ULA), in which eight array elements exist, the element spacing is half wavelength d = $\lambda/2$, the initial transformation phase $\phi_n$, n = 1, ..., 4 is equal to 60°, 120°, 240°, and 300°, and the inter-frame incremental phase $\delta$ = 37° |
| Receiver | MMSE algorithm, x = $(H^H H + \sigma^2 I)^{-1} H^H r$ |
| Frame format | Each frame is divided into four timeslots, the frequency is not divided, and the symbol length in the time-frequency block is L = 128 |

TABLE 2

3GPP Vehicular A channel parameters

| | Channel A | |
|---|---|---|
| Tap | Delay (nsec) | Power (dB) |
| 1 | 0 | 0 |
| 2 | 310 | −1.0 |
| 3 | 710 | −9.0 |
| 4 | 1090 | −10.0 |
| 5 | 1730 | −15.0 |
| 6 | 2510 | −20.0 |

Figure 6:
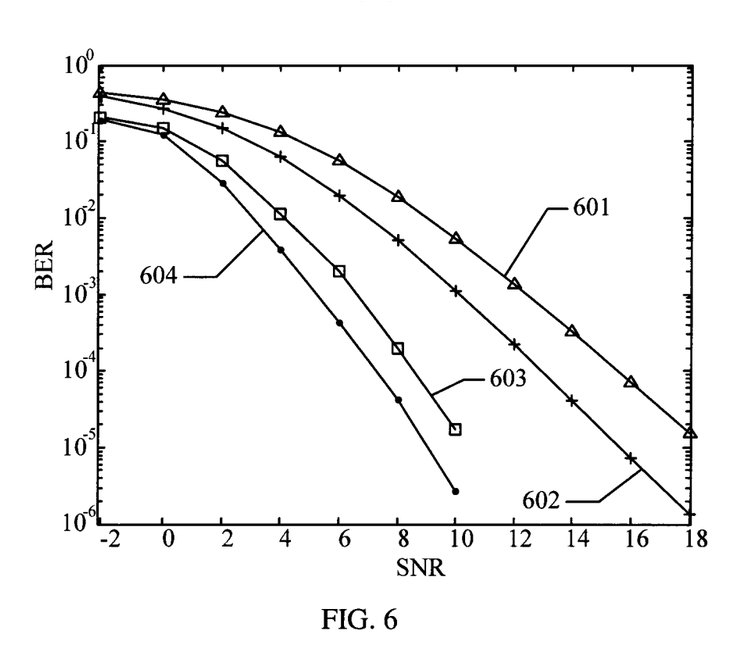
FIG. 6 is a schematic diagram of an simulation experiment of a linear antenna array in an embodiment of the present invention.

As shown in the simulation result curve in FIG. 6, simulation comparison is made between the single-antenna solution and the multi-antenna omnidirectional beam forming solution. LDPC codes and CC codes are applied in each solution, and there are four groups of simulation.

Curve 601 is a performance curve when the multi-antenna omni-directional beam forming employ CC codes; curve 602 is a performance curve when the single antenna employs CC codes; curve 603 is a performance curve when the multi-antenna omnidirectional beam forming employ LDPC codes; and curve 604 is a performance curve when the single antenna employs LDPC codes.

In the simulation, multiple different receiving angles of the cell/sector are selected randomly. The simulation result reveals that the quality of the signals received in different directions in the cell/sector is completely consistent, and proves that the coverage provided by the multi-antenna array in the whole cell/sector in an embodiment of the present invention is isotropic. As shown in FIG. 6, in contrast to the BER performance of a single-antenna, the SNR loss of the received signals in multi-antenna omnidirectional beam forming is only 1-2 dB. In the case of weak channel coding such as CC codes, in contrast to the reliability of a single antenna, the SNR loss of the received signals is approximately 2 dB. In the case of strong channel coding such as LDPC codes, the SNR loss difference between the single-antenna and the multi-antenna omnidirectional beam forming is only 1 dB.

Simulation proves that the omnidirectional beam forming algorithm in a MAS in an embodiment of the present invention provides good coverage for the whole cell/sector.

Figure 7:
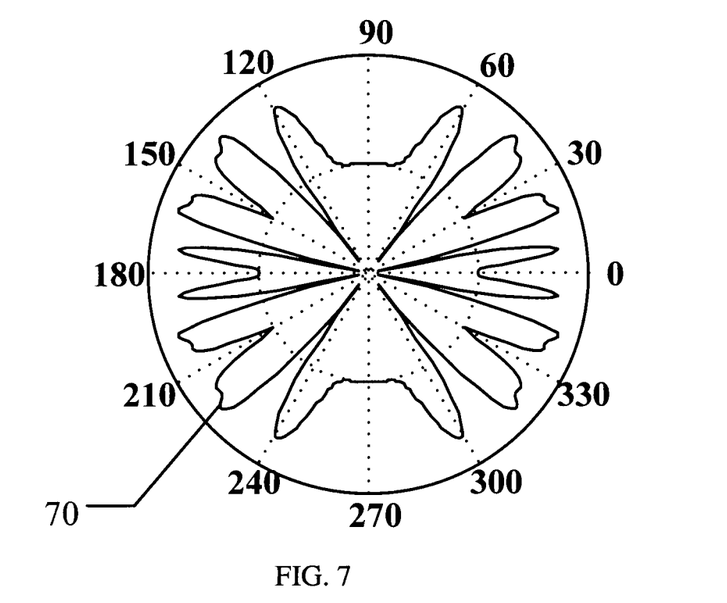
FIG. 7 is a beam pattern of a linear antenna array in an embodiment of the present invention.
Figure 8:
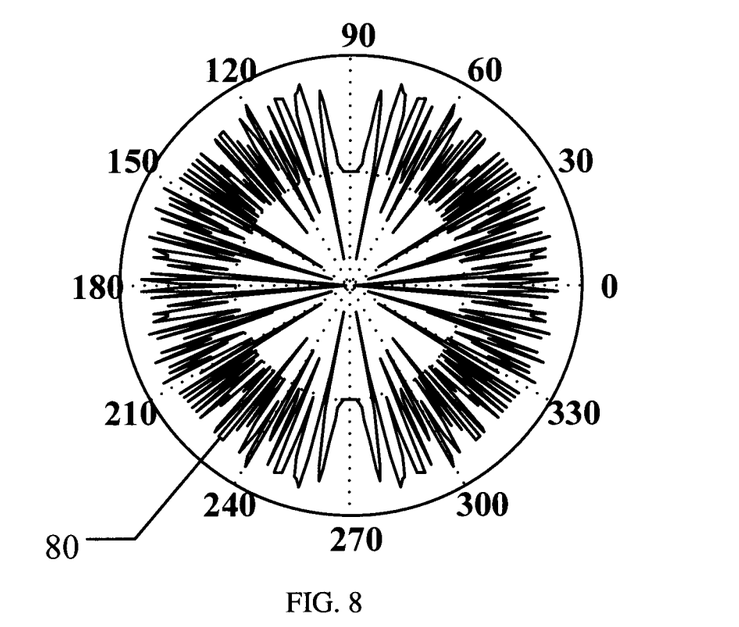
FIG. 8 is another beam pattern of a linear antenna array in an embodiment of the present invention.

The spacing of the antennas selected in the simulation above is a half wavelength, namely, d=$\lambda/2$. The corresponding multi-antenna system is SA. It is evident that through the embodiments of the present invention, the smart antenna system provides good coverage for the whole cell/sector. When the spacing between antennas increases, the correlation between the array elements decreases. The corresponding MAS is a MIMO system. After the spacing between the antennas increases, the steering vector of the antenna changes accordingly, and the beam pattern of the base weighting changes correspondingly, as shown in FIG. 7 and FIG. 8. Curve 701 in FIG. 7 represents a beam pattern of a linear antenna array whose antenna spacing is two wavelengths; in the beam pattern represented by curve 801 in FIG. 8, the antenna spacing is 10 wavelengths. If no condition is changed except that the antenna spacing is changed, and another simulation is performed according to the parameters in Table 1, the simulation result reveals that the change of the antenna spacing brings no impact on the simulation result. Therefore, the curve in FIG. 6 represents the simulation curve no matter whether the antenna spacing is 2 wavelengths or 10 wavelengths.

Figure 9:
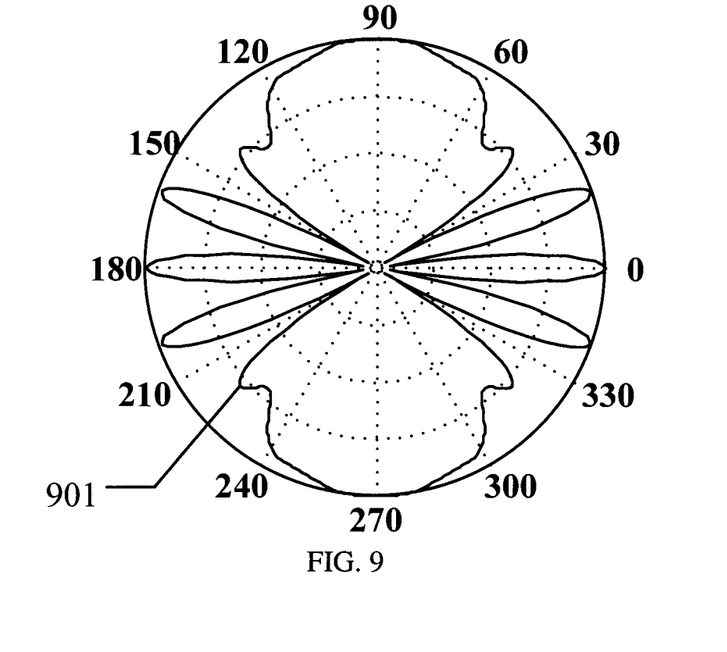
FIG. 9 is a beam pattern of a square antenna array in an embodiment of the present invention.

The MAS simulated above is an ULA. However, the method and the apparatus under the present invention are also applicable to other forms of antenna arrays. The following simulation takes a square array as an example. It is assumed that a square array has eight array elements arranged in two rows, each row includes four array elements, and the spacing between the array elements is uniform. The intra and inter-row spacing are one wavelength. The steering vector of the square array is:

$$\alpha(\theta) = [1\ e^{-j2\pi \sin \theta}\ e^{-j4\pi \sin \theta}\ e^{-j6\pi \sin \theta}\ e^{j2\pi \cos \theta}\ e^{j2\pi(\cos \theta - \sin \theta)}\ e^{j2\pi(\cos \theta - 2 \sin \theta)}\ e^{j2\pi(\cos \theta - 3 \sin \theta)}]^T$$

The following base weighting vector may be selected:

$$w = [1\ 1\ 1\ 1\ 1\ -1\ -1\ 1]^T$$

The beam pattern of the base weighting vector is illustrated by curve 901 in FIG. 9, and is characterized by low peak-to-average ratio.

Figure 10:
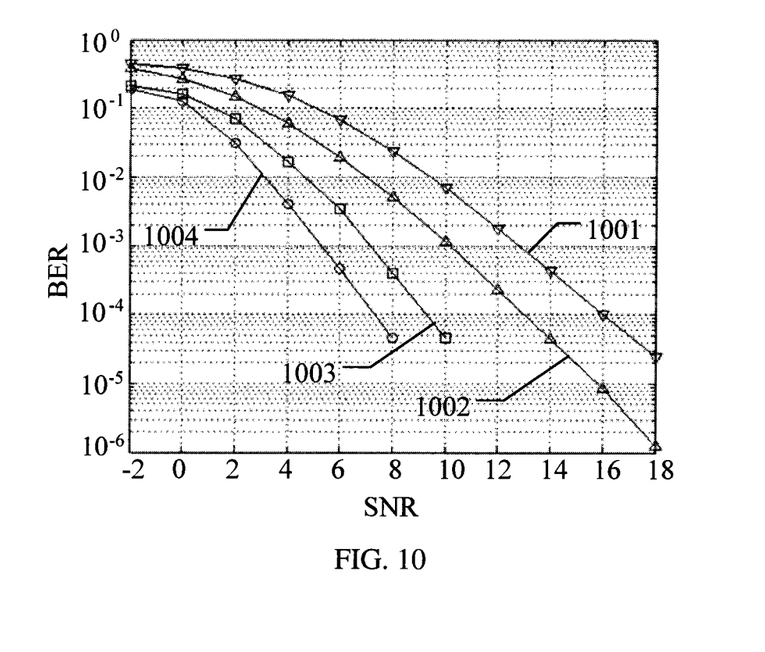
FIG. 10 is a schematic diagram of a simulation experiment of a square antenna array in an embodiment of the present invention.

If no condition is changed except that the linear array is changed to a square array, and another simulation is performed according to the parameters in Table 1, the simulation result is shown in FIG. 10. In FIG. 10, curve 1001 is a performance curve when the square array employs CC codes; curve 1002 is a performance curve when a single antenna employs CC codes; curve 1003 is a performance curve when the square array employs LDPC codes; and curve 1004 is a performance curve when a single antenna employs LDPC codes.

In the simulation, multiple different receiving angles of the cell/sector are selected randomly. The simulation result reveals that the quality of the received signals is not direction-specific, and proves that the coverage provided by the square array in the whole cell/sector in an embodiment of the present invention is isotropic. As shown in FIG. 10, in contrast to the BER performance of a single-antenna, the SNR loss of the received signals in multi-antenna omnidirectional beam forming is only about 2 dB. In the case of weak channel coding such as CC codes, in contrast to the scenario of a single antenna, the SNR loss of the received signals is approximately 2 dB. In the case of strong channel coding such as LDPC codes, the SNR loss difference between the single-antenna and the square-array multi-antenna omnidirectional beam forming is only 1.5 dB. In contrast to the simulation curve of the linear array in FIG. 6, the square array involves SNR loss of about 0.5 dB. That is because a suboptimal base weighting vector is selected in this simulation, and the optimal base weighting vector corresponding to the square array can be reselected to further improve performance.

Furthermore, the apparatus for cell/sector coverage of a public channel through multiple antennas in this embodiment includes:

a dividing unit, configured to divide a physical resource for transmitting public channel signals in a frame into N physical resource blocks, where N is a positive integer greater than 1;

a generating unit, configured to generate N weighting vectors, where: each weighting vector comprises M weighting coefficients, M is equal to the number of antennas, and the difference of average beam pattern for N weighting vectors in different directions of a whole cell/sector is less than a preset value;

a weighting vector selecting unit, configured to select one of the N weighting vectors for each of the N physical resource blocks respectively, where the weighting vector is unequal in each physical resource block;

a weighting unit, configured to use M weighting coefficients in the selected weighting vectors to weight the public channel signals in M antennas respectively; and a transmitting unit, configured to transmit the weighted public channel signals through the M antennas.

The physical resources may be time resource or frequency resource (such as sub-carriers resource in an Orthogonal Frequency Division Multiple Access system) or codes resource (such as spreading codes resource in a Code Division Multiple Access system) or any other resource for communication or any combination of the above resources. Although the embodiments take the time-frequency resource as example, the same procedure may perform using other resources.

Persons of ordinary skill in the art should understand that all or a part of the steps of the method in the embodiments of the present invention may be implemented by a program instructing relevant hardware. The program may be stored in a computer readable storage medium. The storage medium may be a Read-Only Memory (ROM), magnetic disk, or CD-ROM.

Elaborated above are a method and an apparatus for cell/sector coverage method of a public channel through multiple antennas under the present invention. Although the invention is described through some exemplary embodiments, the invention is not limited to such embodiments. It is apparent that those skilled in the art can make modifications and variations to the invention without departing from the spirit and scope of the invention. The invention is intended to cover the modifications and variations provided that they fall in the scope of protection defined by the following claims or their equivalents.

The invention claimed is:

1. A method for cell/sector coverage of a public channel through multiple antennas, comprising:

dividing a physical resource for transmitting public channel signals in a frame into N physical resource blocks, wherein N is a positive integer greater than 1;

generating N weighting vectors, wherein each weighting vector comprises M weighting coefficients, M is equal to the number of antennas, and the difference of average antenna gain for N weighting vectors in different directions of a whole cell/sector is less than a preset value;

selecting one of the N weighting vectors for each of the N physical resource blocks respectively, wherein the N weighting vectors vary with different physical resource blocks;

using the M weighting coefficients in each selected one of N weighting vectors to weight the public channel signals in M antennas respectively; and transmitting the weighted public channel signals through the M antennas;

wherein generating the N weighting vectors further comprises:

obtaining a base weighting vector comprising M weighting coefficients;

obtaining N different phases for a current frame; and transforming the base weighting vector to obtain the N weighting vectors according to the N different phases, wherein the N weighting vectors are different from one another and each of the N weighting vectors comprises M weighting coefficients;

wherein obtaining the base weighting vector comprises:

selecting the base weighting vector to accomplish these effects: a coverage angle of a beam pattern of the base weighting vector reaches a preset threshold, and beam flatness on an angle dimension is higher than another preset threshold.

2. The method of claim 1, wherein transforming the base weighting vector to obtain the N weighting vectors according to the N different phases comprises:

obtaining the N weighting vectors through the following formula:

$$w(t)=\mathrm{diag}[1\,e^{j\phi(t)}\,e^{j2\phi(t)}\ldots e^{j(M-1)\phi(t)}]\cdot w$$

wherein: W is the base weighting vector; for a physical resource block indexed t, the phase is φ(t); j is a virtual unit, $j^2=-1$; diag[$x_1 \ldots x_n$] represents a diagonal array composed of elements from $x_1$ to $x_n$ in the square brackets; w(t) is a weighting vector, and t ranges from 1 to N.

3. The method of claim 1, wherein transforming the base weighting vector to obtain the N weighting vectors according to the N different phases comprises:

selecting a phase among the N different phases;

adding the phase on a phase angle of the mth weighting coefficient of the base weighting vector, wherein m is an ordinal number ranging from 1 to M, and the added phase is in proportion to m-fold of the selected phase;

using the vector with the added phase as a weighting vector; and selecting a different phase among the N different phases and adding the different phase in the repeating process to obtain a different weight vector until the N weighting vectors are obtained.

4. The method according to claim 1, wherein: after the weighted public channel signals are transmitted through the M antennas, the method further comprises:

obtaining a preset inter-frame incremental phase value; and updating the N phases according to the inter-frame incremental phase value.

5. The method according to claim 1, wherein:

the M weighting coefficients in the base weighting vector have the same modulus.

6. The method according to claim 1, wherein obtaining the N different phases comprises:

selecting the N different phases among a range from 0 to 2π according to a preset algorithm.

7. The method according to claim 1, wherein the physical resource is time resource.

8. The method according to claim 1, wherein the physical resource is frequency resource.

9. The method according to claim 1, wherein the physical resource is spreading codes resource.

10. The method according to claim 1, wherein the physical resource is time-frequency resource.

11. An apparatus for cell/sector coverage of a public channel through multiple antennas, comprising:

a dividing unit, configured to divide a physical resource for transmitting public channel signals in a frame into N physical resource blocks, wherein N is a positive integer greater than 1;

a generating unit, configured to generate N weighting vectors, wherein each weighting vector comprises M weighting coefficients, M is equal to the number of antennas, and the difference of average antenna gain for N weighting vectors in different directions of a whole cell/sector is less than a preset value;

a weighting vector selecting unit, configured to select one of the N weighting vectors for each of the N physical resource blocks respectively, wherein the N weighting vectors vary with different physical resource blocks;

a weighting unit, configured to use the M weighting coefficients in each selected one of N weighting vectors to weight the public channel signals in M antennas respectively; and a transmitting unit, configured to transmit the weighted public channel signals through the M antennas;

wherein the generating unit further comprises:

a base weighting vector obtaining unit, configured to obtain a base weighting vector, wherein the base weighting vector comprises M weighting coefficients and M is equal to the number of antennas;

a phase obtaining unit, configured to obtain N different phases; and a transforming unit, configured to transform the base weighting vector obtained by the base weighting vector obtaining unit to obtain N weighting vectors according to each phase obtained by the phase obtaining unit, wherein the N weighting vectors are different from one another, and each of the N weighting vectors comprises M weighting coefficients;

wherein the base weighting vector obtaining unit is further configured to select the base weighting vector to accomplish these effects: a coverage angle of a beam pattern of the base weighting vector reaches a preset threshold, and beam flatness on an angle dimension is higher than another preset threshold.

12. The apparatus according to claim 11, wherein the apparatus further comprises:

an incremental obtaining unit, configured to obtain a preset inter-frame incremental phase value; and a phase updating unit, configured to update the N phases obtained by the phase obtaining unit according to the inter-frame incremental phase value obtained by the incremental obtaining unit.

13. The apparatus according to claim 11, wherein the weighting vector selecting unit comprises at least one of the following units:

a sequence selecting unit, configured to select a corresponding weighting vector among the N weighting vectors sequentially according to order of the N physical resource blocks; and a random selecting unit, configured to select one of the N weighting vectors randomly for each of the N physical resource blocks respectively, wherein the weighting vector is unequal for each physical resource block.

14. The apparatus according to claim 11, wherein the physical resource is time resource.

15. The apparatus according to claim 11, wherein the physical resource is frequency resource.

16. The apparatus according to claim 11, wherein the physical resource is spreading codes resource.

17. The apparatus according to claim 11, wherein the physical resource is time-frequency resource.

* * * * *